United States Patent
Schmidt et al.

(10) Patent No.: US 11,818,987 B1
(45) Date of Patent: Nov. 21, 2023

(54) ARTIFICIAL TURF GROOMING DECK

(71) Applicants: Matthew Schmidt, Baldwin City, KS (US); Brandon Schmidt, Baldwin City, KS (US)

(72) Inventors: Matthew Schmidt, Baldwin City, KS (US); Brandon Schmidt, Baldwin City, KS (US)

( * ) Notice: Subject to any disclaimer, the term of this patent is extended or adjusted under 35 U.S.C. 154(b) by 0 days.

(21) Appl. No.: 18/135,817

(22) Filed: Apr. 18, 2023

(51) Int. Cl.
*A01G 20/43* (2018.01)
*A01G 20/30* (2018.01)

(52) U.S. Cl.
CPC .................................. *A01G 20/30* (2018.02)

(58) Field of Classification Search
CPC .......... A01G 20/43; A01G 20/40; A01G 20/30
See application file for complete search history.

(56) References Cited

U.S. PATENT DOCUMENTS

| | | | |
|---|---|---|---|
| 2,727,264 A * | 12/1955 | Dunham | E01H 1/045 |
| | | | D15/27 |
| 3,026,551 A * | 3/1962 | Smith | A01G 20/43 |
| | | | 15/4 |
| 5,054,151 A * | 10/1991 | Estes, Sr. | A01G 20/40 |
| | | | 15/82 |
| 5,547,030 A * | 8/1996 | Takayama | A47L 11/12 |
| | | | 172/612 |
| 7,028,456 B2 | 4/2006 | Thatcher et al. | |
| 9,572,416 B2 | 2/2017 | Pizano et al. | |
| 9,668,397 B2 | 6/2017 | Davis et al. | |
| 2003/0226671 A1 | 12/2003 | Davis | |
| 2011/0079968 A1 | 4/2011 | Murphy et al. | |
| 2015/0201554 A1 * | 7/2015 | McCarthy | A01D 43/00 |
| | | | 56/14.7 |
| 2016/0316636 A1 * | 11/2016 | Kramer | E01H 1/045 |

\* cited by examiner

*Primary Examiner* — Monica L Perry
(74) *Attorney, Agent, or Firm* — Dale J. Ream

(57) ABSTRACT

This invention is directed to a turf grooming deck configured for attachment to a lawn tractor and includes a deck member positioned between front and rear wheels of the lawn tractor and having an upper platform and a plurality of downwardly depending surfaces that, together, defines an interior area. A plurality of channels is mounted to a bottom surface of the upper platform and arranged in a diamond configuration. Further, the sidewalls define channel openings by which the channels are accessed. The turf grooming deck includes first and second brush modules, each brush module including a plurality of brush members, a first module including a plurality of metal tines and the second module including a plurality of push broom type bristles. The brush modules are interchangeable by insertion or removal thereof relative to respective channels via respective channel openings.

20 Claims, 9 Drawing Sheets

ARTIFICIAL TURF GROOMING DECK

BACKGROUND OF THE INVENTION

This invention relates generally to turf grooming devices and, more particularly, to a turf grooming deck for a lawn tractor that includes slidably interchangeable grooming modules.

Natural grass fields traditionally provide the playing surface for many team sporting events, such as for games of football, soccer, rugby, or the like. Natural grass and natural turf fields are adequate so long as the soil and grass are subject to sufficient rainfall, sunshine, and that divots, scars, or other bare spots are adequately and frequently given attention, such as by a groundskeeper.

Because natural grass or turf fields may become waterlogged, muddy, or in disrepair, modern game play fields are often constructed of simulated turf, sometimes referred to as Astroturf or, generically, as artificial turf. In fact, the installation of synthetic turf athletic fields by school districts, municipal governments, colleges and universities, and professional sports organizations has become widespread throughout the US. Artificial turf is a surface of synthetic fibers configured to look like authentic grass. More particularly, commonly used base materials are granulated crumb rubber produced from used tires, flexible plastic pellets, sand, and rubber-coated sand. A combination of sand and crumb rubber is also used. While artificial turf is much easier to maintain than grass, regular cleaning is still an important part of its upkeep. Proper maintenance helps ensure the longevity of the synthetic material while preventing a buildup of dirt and grime. Further, the rubber base material may crumble, degrade, and otherwise need to be removed or replaced, such as by impacting the artificial surface with metal tines and suctioning the broken rubber fragments. The longevity of the turf requires periodic deep cleaning. This typically involves the use of a power brush cleaner, which can help remove most of the debris from the surface while improving the look and feel of the turf.

Various machines for grooming and artificial turf mat or carpet have been proposed in the prior art and often include complex machinery comparable to a Zamboni machine for rejuvenating an ice surface. Such machines may require an accessory having one type of brush to be completely removed from a mobility tractor and a different accessory having another type of brush to be attached. Each removal and replacement of brush accessories results in significant downtime or, stated more practically, significant wasted time. Obviously, the more time that is spent on reconfiguring a grooming machine is time not being spent actually grooming the artificial turf field.

Therefore, it would be desirable to have a turf grooming deck for attachment to a traditional lawn tractor in which more than one type of brush may be utilized without removal of the deck from the lawn tractor. Further, it would be desirable to have a grooming deck that includes multiple channels situated at different angles and each allowing slidable insertion or removal of multiple brush modules, respectively.

SUMMARY OF THE INVENTION

A turf grooming deck according to the present invention is configured for attachment to a lawn tractor (e.g., a lawnmower) and includes a deck member positioned between front and rear wheels of the lawn tractor and having an upper platform and a plurality of downwardly depending surfaces that, together, define an interior area. A plurality of channels is mounted to a bottom surface of the upper platform and arranged in a diamond configuration. Further, the sidewalls define channel openings by which the channels are accessed. The turf grooming deck includes first and second brush modules, each brush module including a plurality of brush members, a first module including a plurality of metal tines and the second module including a plurality of push broom type bristles. The brush modules are interchangeable by insertion thereof into respective channels via respective channel openings. In a preferred use, the first brush modules are slidably inserted into the channels for impacting the artificial turf surface using metal tines that break up and remove rubber fragments. The first brush modules are then slidably removed and replaced with the second brush modules configured for spreading appropriate materials and cleaning debris from the turf surface.

Therefore, a general object of this invention is to provide a turf grooming deck for attachment to a traditional lawn tractor that includes multiple channels for slidable insertion or removal of artificial turf brush modules, respectively.

Another object of this invention is to provide a turf grooming deck, as aforesaid, having a first plurality of brush modules each having a plurality of generally linear tines and which may be inserted along rails of respective channels via respective channel openings.

Still another object of this invention is to provide a turf grooming deck, as aforesaid, having a second plurality of brush modules each having a plurality of tightly packed push broom bristles and which may be inserted along rails of respective channels via respective channel openings.

Other objects and advantages of the present invention will become apparent from the following description taken in connection with the accompanying drawings, wherein is set forth by way of illustration and example, embodiments of this invention.

BRIEF DESCRIPTION OF THE DRAWINGS

FIG. 2b is an isolated view on an enlarged scale taken from FIG. 2a;

FIG. 5a is a partially exploded view of the deck member as an FIG. 4a;

FIG. 5b is an isolated view on an enlarged scale taken from FIG. 5a;

DESCRIPTION OF THE PREFERRED EMBODIMENT

A turf grooming deck according to a preferred embodiment of the present invention will now be described with reference to FIGS. 1 to 9 of the accompanying drawings. The turf grooming deck 10 includes a deck member. 20 mounted to a lawn tractor 12, a first plurality of brush modules 40, and a second plurality of brush modules 50.

Figure 1:
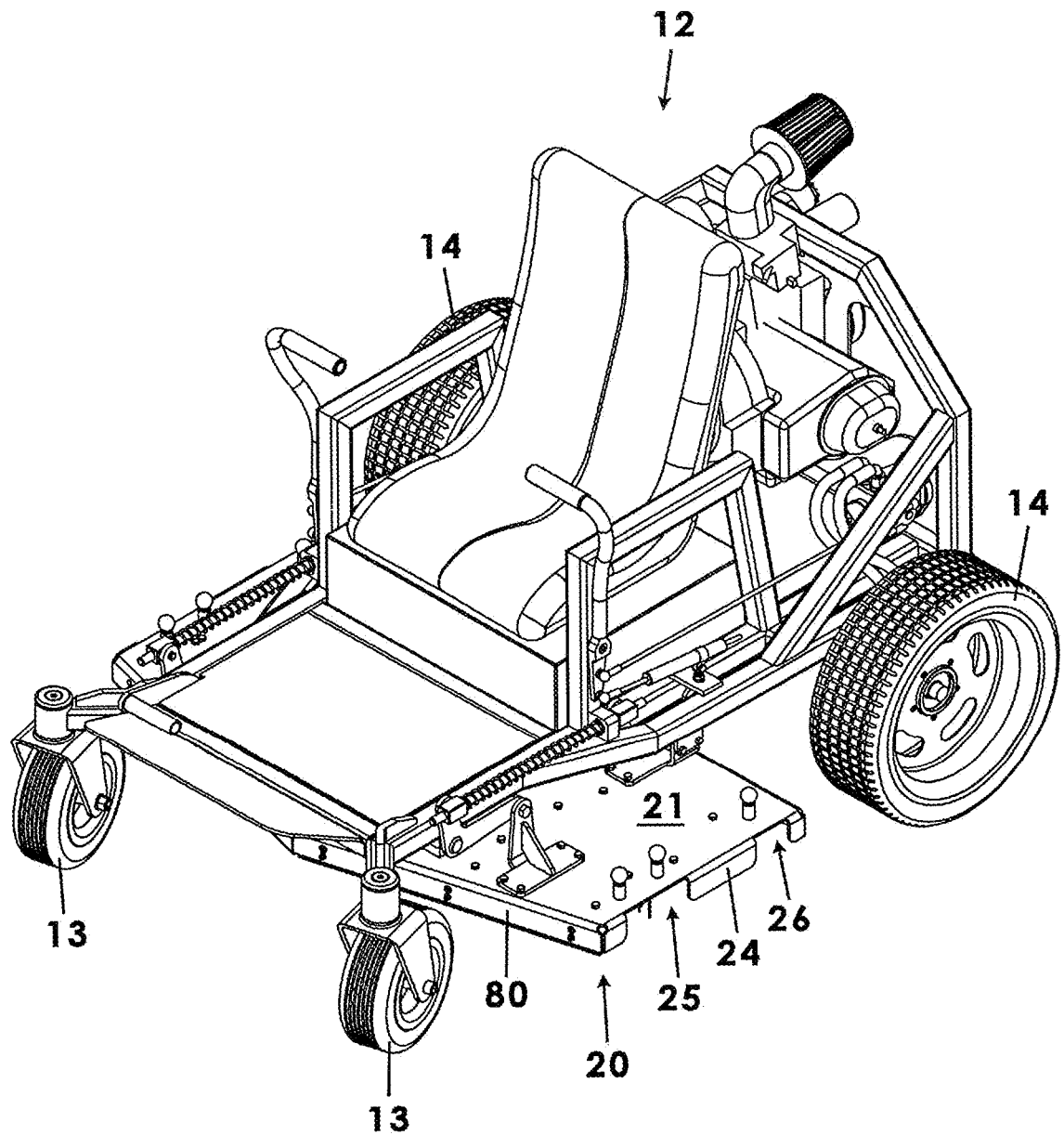
FIG. 1 is a perspective view of a turf grooming deck attached to a lawn tractor frame according to a preferred embodiment of the present invention.
Figure 2A:
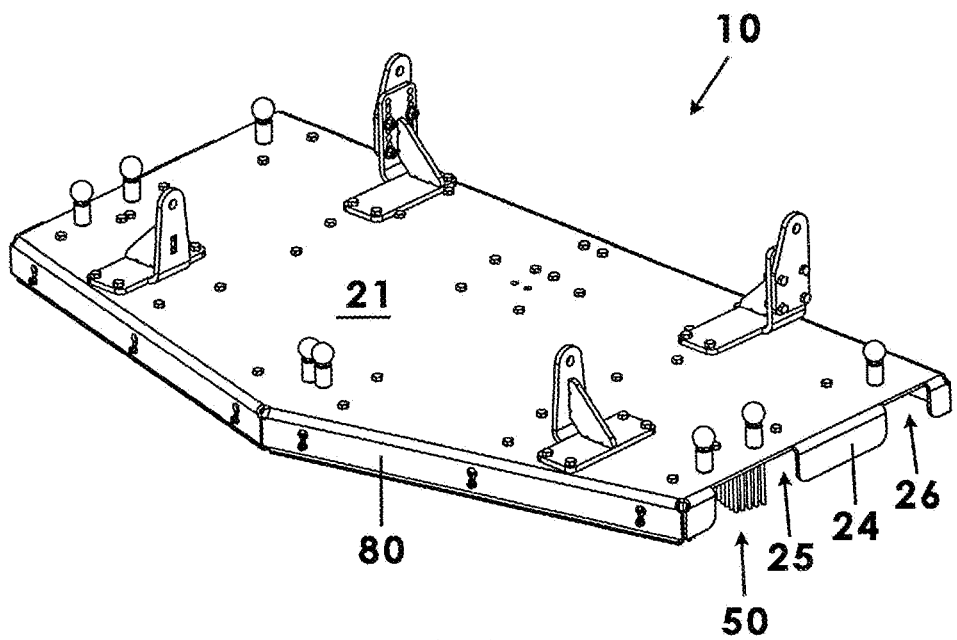
FIG. 2a is a perspective view of the turf grooming deck, illustrated in an upright configuration and removed from the contractor.
Figure 2B:
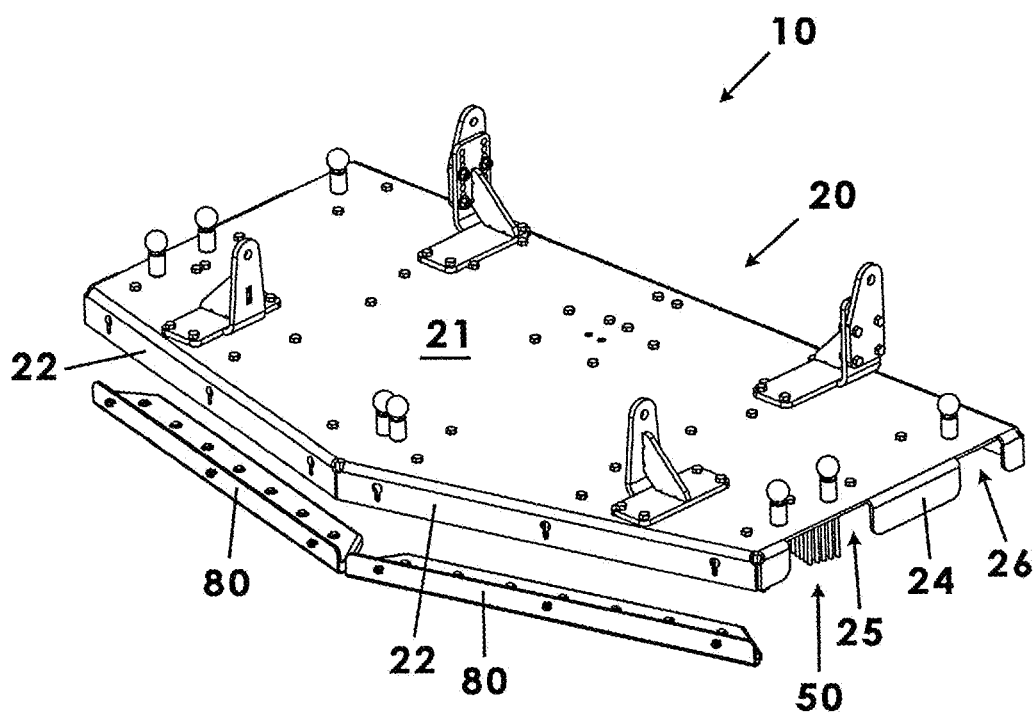
Figure 3A:
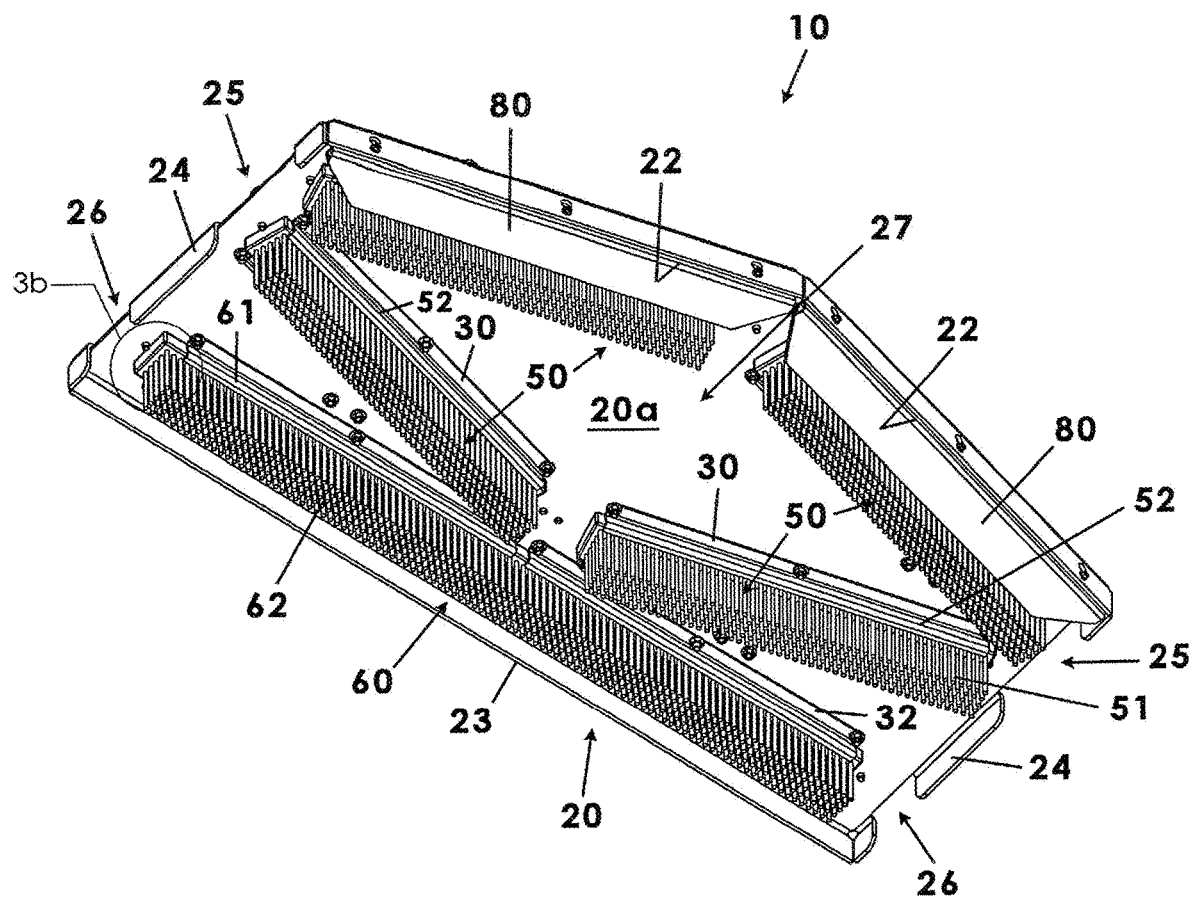
FIG. 3a is an inverted perspective view of the deck member, illustrated with a plurality of second brush members installed according to a preferred embodiment of the present invention.
Figure 3B:
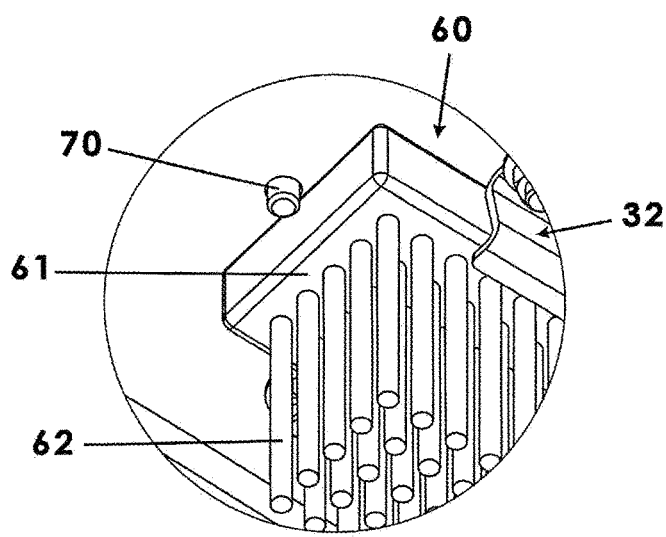
FIG. 3b is an isolated view on an enlarged scale taken from FIG. 3a, illustrated with a stop member in a deployed configuration.

The deck member 20 is intended to be mounted to a lawn tractor 12 in a manner substantially similar to attachment of a deck surrounding a blade for mowing grass. More particularly, the deck member 20 is configured to be attached to a lawn tractor 12 and mounted to a framework between a pair of front wheels 13 and a pair of rear wheels 14 (FIG. 1).

The deck member 20 includes a configuration substantially similar to that of a traditional lawnmower deck except as specifically described below. The deck member 20 includes an upper platform 21 (a.k.a. an upper surface) having a generally planar configuration. In an embodiment, the upper platform 21 has a pentagonal configuration, e.g., a geometric shape having five corners and five edges. Further, the deck member 20 includes a plurality of downwardly depending surfaces that will be referenced as including a front wall 22, a rear wall 23, and a pair of sidewalls 24 extending between the front 22 and rear 23 walls, respectively. A bottom surface of the upper platform 21 and the downwardly depending walls, together, define an interior area 27. In an embodiment, the turf grooming deck 10 may include at least one magnetic member 80 (and, preferably, a pair of magnetic members 80) each magnetic member 80 having an elongate and generally rectangular configuration that is coupled to the front wall 22 of the deck member 20. Preferably, each magnetic member 80 extends downwardly toward a ground surface, such as the artificial turf surface, and is operative to magnetically attract and, therefore, pick up or extract any metallic materials that may be lying on the artificial turf that is being cleaned/groomed as will be described in more detail later. It is understood that metallic or magnetic materials collected by the magnetic members 80 may be periodically cleaned off with a swipe of a tool or a person's gloved hand, or the like.

In a critical aspect, the pair of opposed sidewalls 24 each define at least two and, preferably, a plurality of channel openings 25 through which access from outside the deck member 20 and the interior area 27 beneath the deck member 20 may be accessed as will be described in further detail later. More particularly, the pair of sidewalls 24 define a pair of channel openings 25, respectively, the pair of channel openings 25 being adjacent the front wall 22 of the deck member 20. Further, the pair of sidewalls 24 may also define a pair of auxiliary openings 26, respectively, the pair of auxiliary openings 26 being positioned adjacent the rear wall 23. The purpose of the channel openings 25 and auxiliary openings 26 will be discussed later. It is understood that additional walls and frame structures not described above may be included in various embodiments.

Figure 4A:
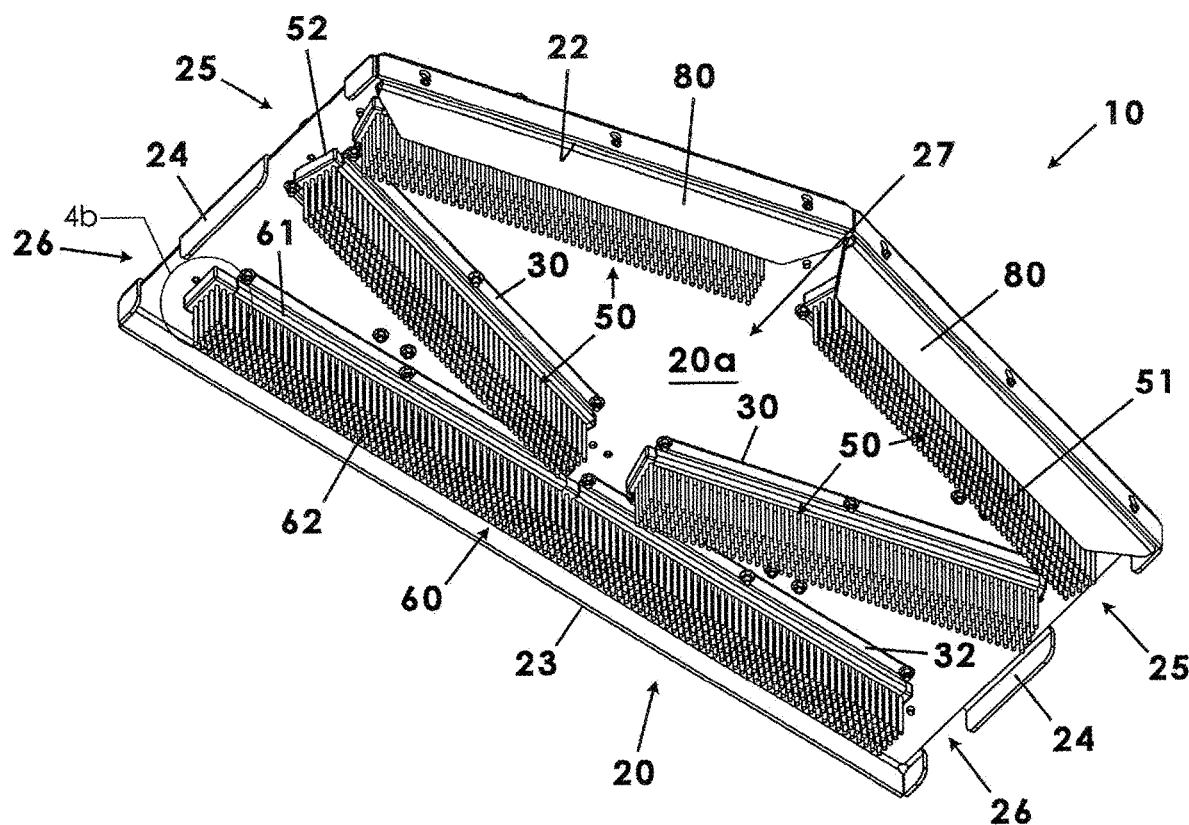
FIG. 4a is an inverted perspective view of the deck member, illustrated with a plurality of second brush members installed according to a preferred embodiment of the present invention.
Figure 4B:
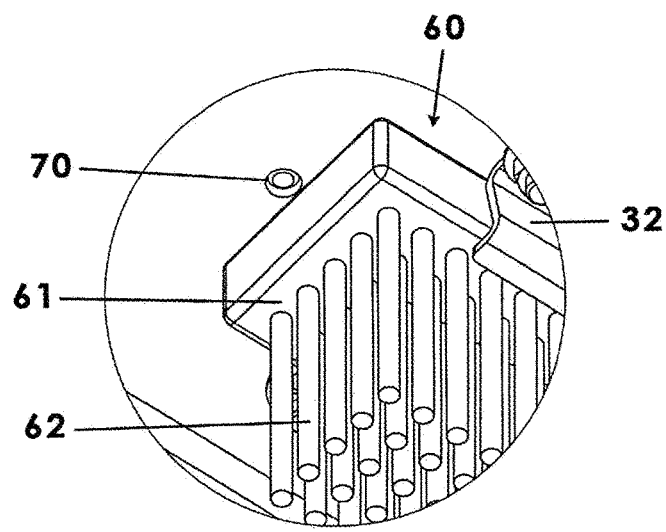
FIG. 4b is an isolated view on an enlarged scale taken from FIG. 4a, illustrated with a stop member in a compressed configuration.
Figure 5A:
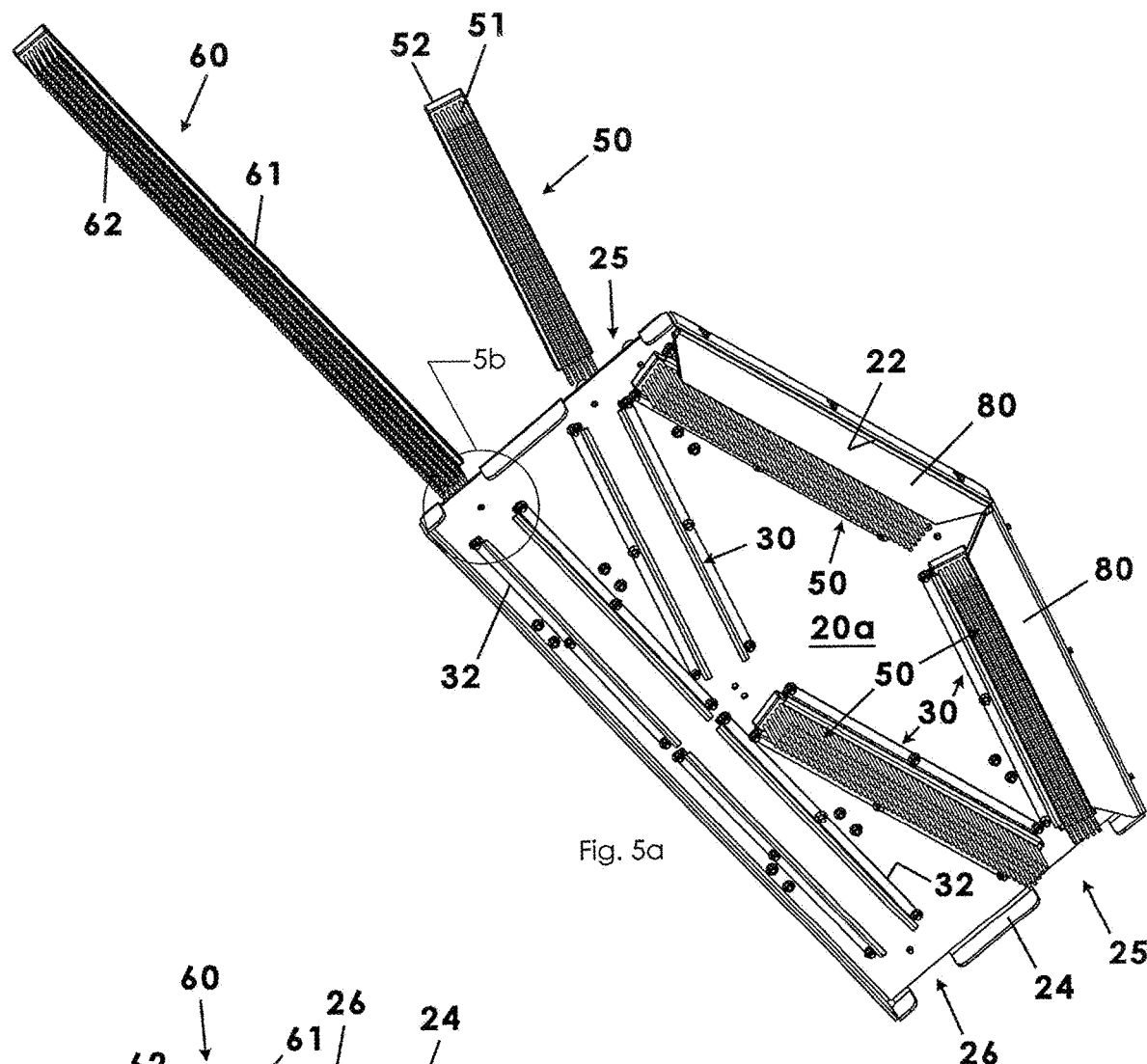
Figure 5B:
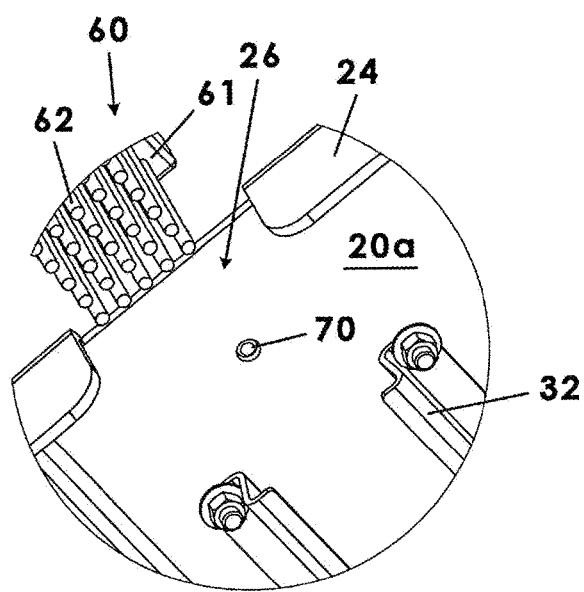
Figure 6:
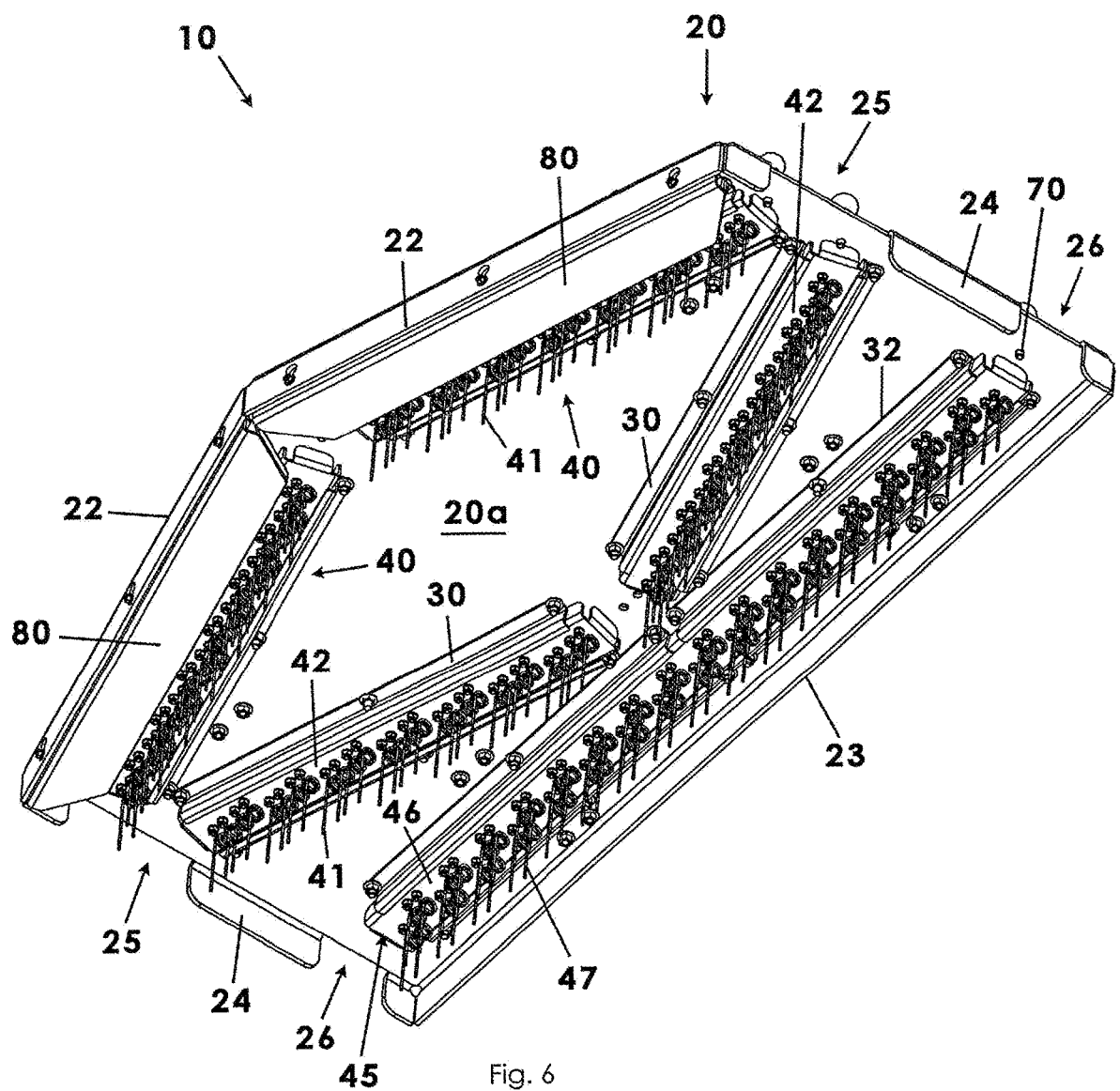
FIG. 6 is an inverted perspective view of the deck member as in FIG. 4*a*, illustrated with a plurality of first brush members installed according to a preferred embodiment of the present invention.
Figure 7:
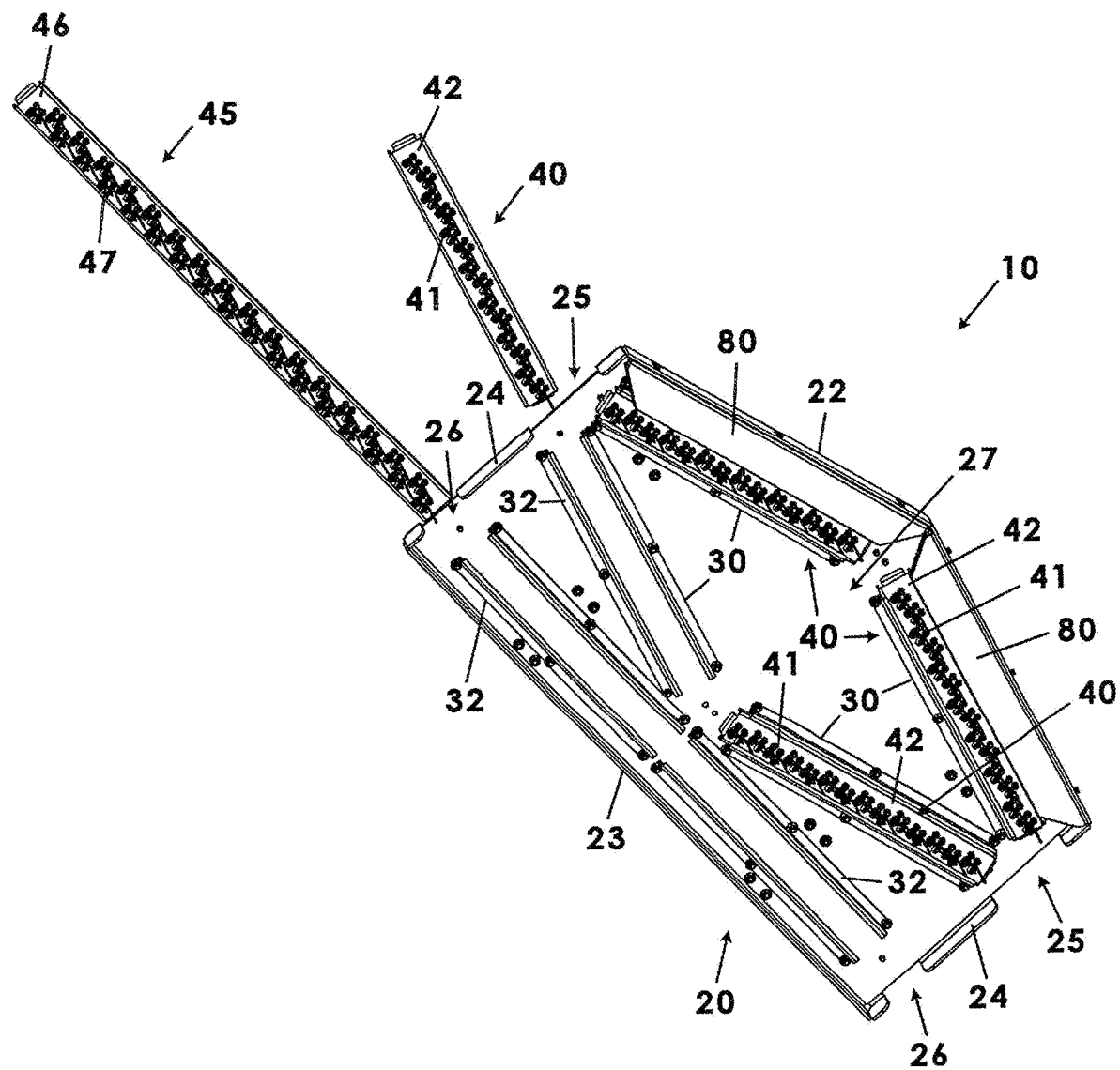
FIG. 7 is a partially exploded view of the deck member as in FIG. 6.

In another critical aspect, the deck member 20 of the turf grooming deck 10 may include a plurality of channels 30 mounted to a bottom surface 20*a* of the deck member 20, each channel 30 being configured to slidably receive a brush module, as will be explained in more detail below. More particularly, each channel 30 may include a pair of rails 31 that are parallel to one another and each having a linear configuration (FIG. 5*a*). In other words, each channel 30 provides a track along which a base of a respective brush member may travel along and as will be described in further detail later. Importantly, respective channels 30 are coupled to the bottom surface 20*a* of the deck member 20 and may be arranged in a diamond-shaped configuration as this configuration is most conducive to completely clean or remediate a turf surface. More particularly, the diamond-shaped configuration will allow respective pair of brush members to make contact with a turf surface at opposing angles (FIG. 4*a*).

Similarly, an auxiliary channel 32 may be mounted to a bottom surface 20*a* of the deck member 20 in a position that is parallel with the rear wall 23 and that is intermediate (i.e., sandwiched between) the plurality of channels 30 and the rear wall 23. As will be explained below, a first auxiliary brush member 45 may include a first auxiliary base 46 having an elongate configuration so as to be slidably received upon the auxiliary channel 32, the first auxiliary brush member 45 being configured for insertion into or removal from a respective auxiliary opening 26. In an embodiment, the first auxiliary brush member 45 may include a plurality of first auxiliary tines 47 as shown particularly in FIGS. 6. Similarly, a second auxiliary brush member 60 may include a second auxiliary base 61 having an elongate configuration so as to be slidably received upon the auxiliary channel 32, the second auxiliary brush member 60 being configured for insertion into or removal from a respective auxiliary opening 26. In an embodiment, the auxiliary brush member 60 may include a plurality of tightly packed second auxiliary bristles 62 as shown particularly in FIGS. 5*a* and 5*b*.

In another critical aspect, the turf grooming deck 10 includes at least one first brush module 40 and, preferably, a plurality of first brush modules 40. Each first brush module 40 has a configuration that is receivable and slidably movable along a respective channel 30 after having been inserted into the interior area 27 through a respective channel opening 25. More particularly, each first brush module 40 may include a first base member 42 having an elongate, linear, and planar surface configuration that is slidably movable along the rails 31 of a respective channel 30 after being inserted through a respective channel opening 25. It is understood that the movement of a first brush module 40 along a channel 30 is by manual exertion of a user. Further, each first brush module 40 includes a plurality of tines 41 as will be described in more detail later.

Similarly, the turf grooming deck 10 includes at least one second brush module 50 and, preferably, a plurality of second brush modules 50. Each second brush module 50 has a configuration that is receivable and slidably movable along a respective channel 30 after having been inserted into the interior area 27 through a respective channel opening 25. More particularly, each second brush module 50 may include a second base member 52 having an elongate, linear, and planar surface configuration that is slidably movable along the rails 31 of a respective channel 30 after being inserted through a respective channel opening 25. Further, each second brush module 50 may include a plurality of tightly packed bristles 51 as will be described in more detail later. It is understood that the movement of a second brush module 50 along a channel 30 is by manual exertion of a user. It is understood that because the channels 30 and base members 42, 52 are mounted to the bottom surface 20 of the deck member 20, the first and second brush modules 40, 50 are actually upside down such that the tines 41 and bristles 51 extend downwardly toward and in contact with the ground surface as shown in the illustrations, i.e., with the artificial turf.

It is understood that, in use, the plurality of first brush modules 40 must be slidably removed from the plurality of channels 30 before the plurality of second brush modules 50 and be inserted as will be described in greater detail later.

Figure 8:
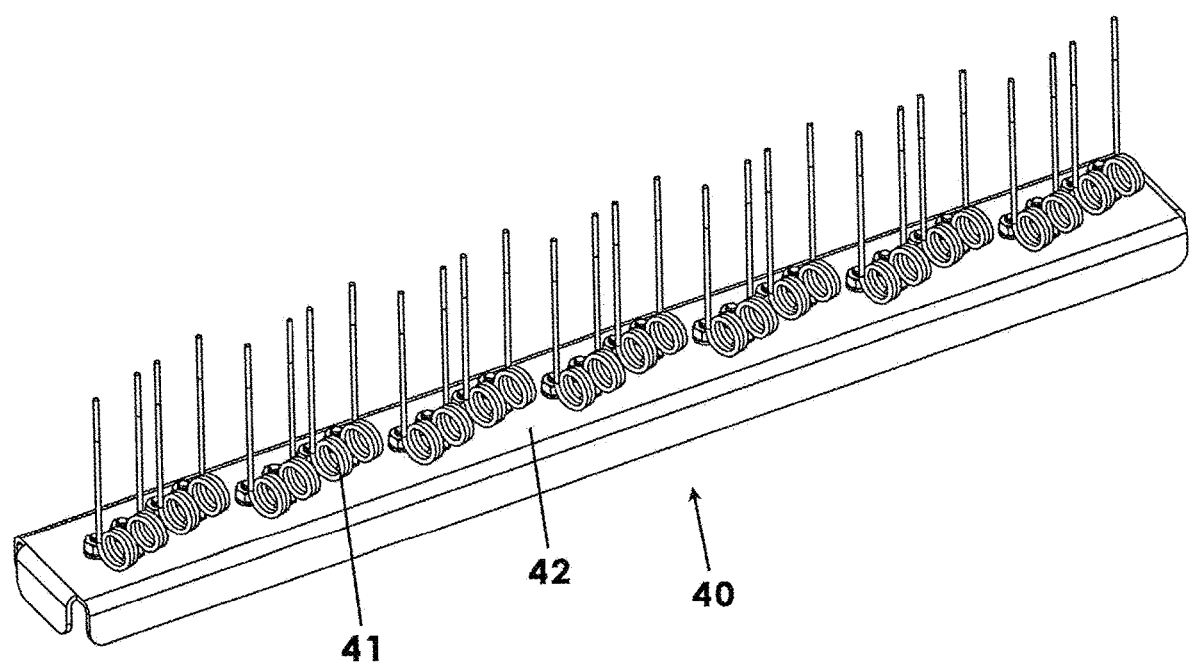
FIG. 8 is a perspective view on an enlarged scale of a first brush member removed from the deck member as in FIG. 7.
Figure 9:
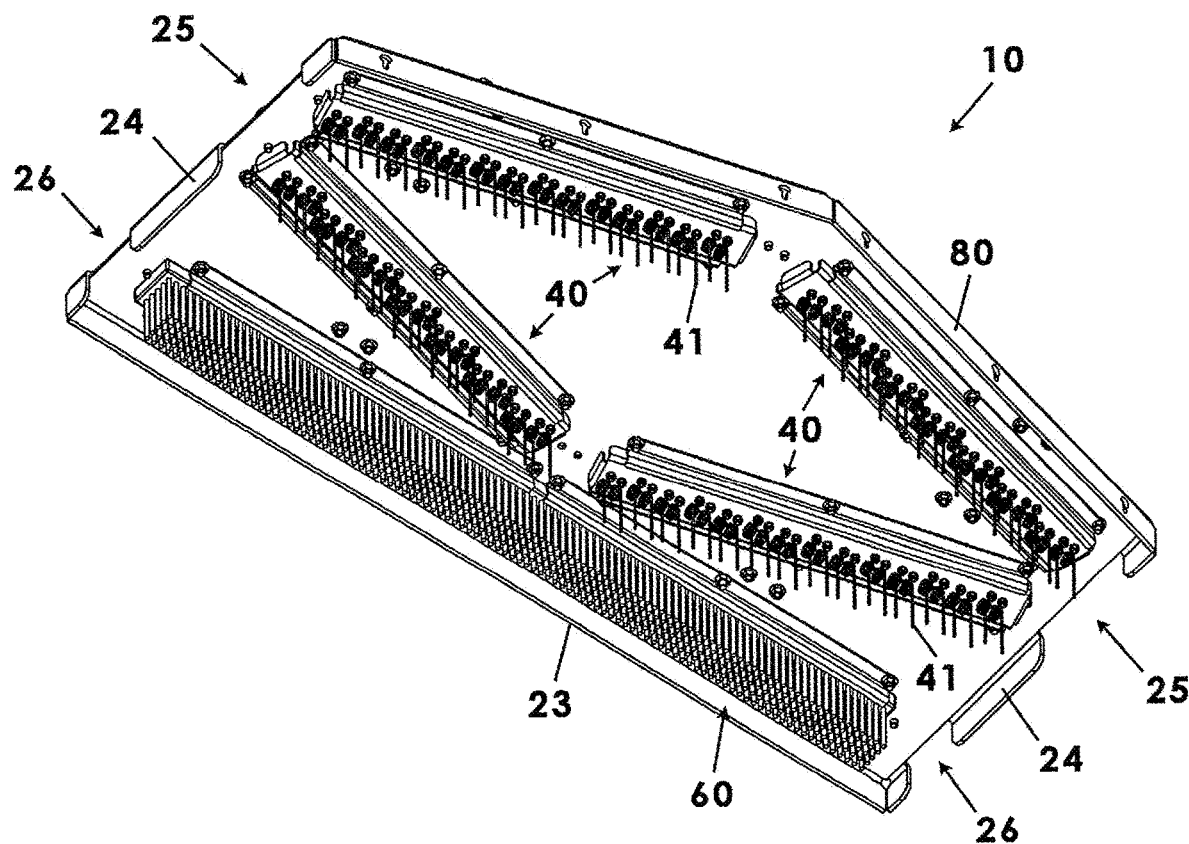
FIG. 9 is a perspective view of the deck member as in FIG. 7.

The specific configurations and constructions of the first and second brush modules will now be discussed in detail. Each first brush module 40 includes at least one and, preferably, a plurality of metal tines 41, each tine 41 being coupled to and extending away from a top surface of a first base member 42 (FIG. 8). In an embodiment, each tine 41 may be coupled to the base member 42 using a combination of bolts and brackets or comparable fasteners as would be understood by persons of ordinary skill in the art. Preferably, each tine 41 has a linear and elongate configuration that, in use, will make contact with and intentionally disrupt the artificial turf surface. The plurality of tines 41 may generally define a longitudinal axis (a.k.a. a horizontal axis). In an embodiment, the plurality of tines 41 may be separated or segregated into groupings 41a, each grouping including a predetermined number of tines 41, such as groupings each having two tines or four tines. Preferably, each grouping 41a defines its own grouping axis that is offset from the overall longitudinal axis defined by the plurality of tines 41—such as being offset forwardly or rearwardly or even angularly (FIG. 8).

By contrast, each second brush module 50 includes at least one and, preferably, a plurality of tightly packed bristles 51. Specifically, the bristles may be tightly packed synthetic push broom type bristles 51 (FIG. 5a). Again, the plurality of bristles 51 are configured to recondition and clean a surface of the turf as the brushes are moved across the turf surface.

In another aspect, the deck member 20 includes at least one stop member 70 mounted and positioned adjacent each channel opening 25. In an embodiment, the stop member 70 may be in the form of a spring-loaded pin and, thus, movable between a compressed configuration allowing insertion of a respective brush member (FIG. 5b) and a deployed configuration not allowing insertion or removal of a respective brush member (FIG. 4a). More particularly, each stop member 70 is positioned between the proximal end of a respective channel 30 and a respective channel opening 25 and is configured to prevent an unintended outward sliding of a respective brush module. In other words, each stop member 70 has a shape configuration and profile sufficient to block passage of a respective base member of a respective brush module.

In use, the deck member 20 is mounted to the frame of a lawn tractor 12 between its pairs of front and rear wheels and a manner substantially similar to mounting a deck configured to mow a lawn. Only in the case of the present invention, the deck member 20 conspicuously has no blade for cutting grass but, rather, has the plurality of channels 30, the pair of channel openings 25, and the plurality of first brush modules 40, and plurality of second brush modules 50. As described above, the plurality of first brush members 40 may be inserted through respective channel openings 25 into the interior area 27 of the deck member 20 and along the rails 31 of respective channels 30. When the lawn tractor is actuated (i.e., when the motor thereof is energized), the plurality of first brush members 40 are configured to firmly engage an artificial turf surface whereby to disrupt the rubber or rubber fragments of the artificial turf. Other components, including a vacuum, may be utilized for lifting or removing said fragments. Then, according to a preferred method of the present invention, the plurality of first brush members 40 may be individually and respectively removed from respective channels 30 via respective channel openings 25 and systematically replaced by the plurality of second brush members 50 via the same openings. Once again, the lawn tractor 12 may be engaged to traverse the artificial turf surface so that the plurality of bristles may be engaged upon the artificial turf surface so as to clean it thoroughly. Finally, the plurality of second brush members 50 may be individually removed via respective channel openings 25.

It is understood that while certain forms of this invention have been illustrated and described, it is not limited thereto except insofar as such limitations are included in the following claims and allowable functional equivalents thereof.

The invention claimed is:

1. A turf grooming deck configured for attachment to a lawnmower having a frame having a pair of front wheels and a pair of rear wheels and configured to traverse ground in a mowing-type configuration, said turf grooming deck, comprising:
   a deck member positioned between the pairs of front and rear wheels, respectively, and having an upper platform and a plurality of downwardly depending surfaces including a front wall, a rear wall, and a pair of sidewalls extending between said front and rear walls, respectively, said upper platform and said plurality of depending surfaces, together, defining an interior area;
   a plurality of channels each mounted to a bottom surface of said upper platform and having a linear configuration, said plurality of channels being arranged in a diamond configuration;
   said pair of sidewalls each defining a channel opening in communication with said plurality of channels, respectively; and
   a plurality of first brush modules each having a configuration that is slidably receivable in a respective channel via a respective channel opening.

2. The turf grooming deck as in claim 1, wherein:
   each channel includes a pair of rails having a parallel configuration;
   said each first brush module includes a first base member having an elongate, planar, and linear configuration that is slidably movable along said pair of rails of a respective channel.

3. The turf grooming deck as in claim 2, wherein said each first brush module is coupled to said first base member and extends upwardly.

4. The turf grooming deck as in claim 2, wherein said each first brush module includes a metal tine having a generally linear configuration.

5. The turf grooming deck as in claim 4, wherein:
   said each first base member defines an imaginary longitudinal axis;
   said each first brush module includes a plurality of tine groupings, each tine grouping defining a horizontal axis that is offset from said imaginary longitudinal axis.

6. The turf grooming deck as in claim 5, wherein each tine grouping includes 2 tines arranged at an angle offset from said imaginary longitudinal axis.

7. The turf grooming deck as in claim 1, further comprising a second brush module each being slidably receivable in a respective channel via a respective channel opening.

8. The turf grooming deck as in claim 7, wherein:
each channel includes a pair of rails having a parallel configuration;
said each second brush module includes a second base member having an elongate, planar, and linear configuration that is slidably movable along said pair of rails of a respective channel.

9. The turf grooming deck as in claim 8, wherein said plurality of second brush modules each includes a plurality of tightly packed synthetic push broom bristles.

10. The turf grooming deck as in claim 7, further comprising:
an auxiliary channel mounted to an inner surface of said upper platform and having a linear configuration, said auxiliary channel being rearwardly sandwiched between said plurality of channels and said rear wall of said deck;
said pair of sidewalls each defining an auxiliary channel opening in communication with said auxiliary channel, respectively; and
an auxiliary brush module having a plurality of brush members and being slidably receivable in said auxiliary channel via said auxiliary channel opening.

11. A turf grooming deck configured for attachment to a lawnmower having a frame having a pair of front wheels and a pair of rear wheels and configured to traverse ground in a mowing-type configuration, said turf grooming deck, comprising:
a deck member positioned between the pairs of front and rear wheels, respectively, and having an upper platform and a plurality of downwardly depending surfaces including a front wall, a rear wall, and a pair of sidewalls extending between said front and rear walls, respectively, said upper platform and said plurality of depending surfaces, together, defining an interior area;
a plurality of channels each mounted to a bottom surface of said upper platform and having a linear configuration, said plurality of channels being arranged in a diamond configuration;
said pair of sidewalls each defining a channel opening in communication with said plurality of channels, respectively;
a plurality of first brush modules each being slidably receivable in a respective channel via a respective channel opening; and
a plurality of second brush modules each being slidably receivable in a respective channel via a respective channel opening.

12. The turf grooming deck as in claim 11, wherein:
each channel includes a pair of rails having a parallel configuration;
said each first brush module includes a first base member having an elongate, planar, and linear configuration that is slidably movable along said pair of rails of a respective channel;
said each second brush module includes a second base member having an elongate, planar, and linear configuration that is slidably movable along said pair of rails of a respective channel.

13. The turf grooming deck as in claim 11, further comprising:

at least one stop member mounted intermediate a proximal end of a respective channel and a respective channel opening, said at least one stop member, when deployed, being configured to prevent an unintended removal of a respective first brush module or a respective second brush module from said respective channel; and
at least one magnetic member coupled to an outer surface of said front wall of said deck member.

14. The turf grooming deck as in claim 12, wherein:
said plurality of first brush modules each includes a metal tine having a generally linear configuration; and
said plurality of second brush modules each includes a plurality of tightly packed synthetic push broom bristles.

15. The turf grooming deck as in claim 11, further comprising:
an auxiliary channel mounted to an inner surface of said upper platform and having a linear configuration, said auxiliary channel being rearwardly sandwiched between said plurality of channels and said rear wall of said deck;
said pair of sidewalls each defining an auxiliary channel opening in communication with said auxiliary channel, respectively; and
an auxiliary brush module slidably receivable in said auxiliary channel via said auxiliary channel opening.

16. A method for grooming an artificial turf surface using a lawn tractor of a type that includes a frame having a pair of front wheels and a pair of rear wheels and configured to traverse ground in a mowing-type configuration, the method of grooming, comprising:
providing a deck member mounted between the pairs of front and rear wheels, respectively, and having an upper platform and a plurality of downwardly depending surfaces including a front wall, a rear wall, and a pair of sidewalls extending between said front and rear walls, respectively, said upper platform and said plurality of depending surfaces, together, defining an interior area;
wherein said deck includes a plurality of channels each mounted to a bottom surface of said upper platform and having a linear configuration, said plurality of channels being arranged in a diamond configuration;
wherein said pair of sidewalls each defines a channel opening in communication with said plurality of channels, respectively;
slidably inserting a plurality of first brush modules through respective channel openings and along respective channels;
slidably removing said each first brush module from said respective channel via said respective channel opening; and
slidably inserting a plurality of second brush modules through said respective channel openings and along said respective channels.

17. The method for grooming as in claim 16, wherein:
each channel includes a pair of rails having a parallel configuration;
said each first brush module includes a first base member having an elongate, planar, and linear configuration that is slidably movable along said pair of rails of a respective channel;
said each second brush module includes a second base member having an elongate, planar, and linear configuration that is slidably movable along said pair of rails of a respective channel.

18. The method for grooming as in claim 17, wherein:
- said plurality of first brush modules each includes a metal tine having a generally linear configuration; and
- said plurality of second brush modules each includes a plurality of tightly packed synthetic push broom bristles.

19. The method for grooming as in claim 16, further comprising:
- an auxiliary channel mounted to an inner surface of said upper platform and having a linear configuration, said auxiliary channel being rearwardly sandwiched between said plurality of channels and said rear wall of said deck;
- said pair of sidewalls each defining an auxiliary channel opening in communication with said auxiliary channel, respectively; and
- an auxiliary brush module having a plurality of auxiliary brush modules and being slidably receivable in said auxiliary channel via said auxiliary channel opening.

20. The method for grooming as in claim 16, comprising providing at least one stop member intermediate a proximal end of a respective channel and a respective channel opening so as to prevent an unintended removal of a respective first brush module or a respective second brush module from said respective channel.

\* \* \* \* \*